(12) United States Patent
Bachar et al.

(10) Patent No.: US 8,972,350 B2
(45) Date of Patent: Mar. 3, 2015

(54) PRESERVING A STATE USING SNAPSHOTS WITH SELECTIVE TUPLE VERSIONING

(75) Inventors: Yariv Bachar, Tel Aviv (IL); Aviv Kuvent, Raanana (IL); Asaf Levy, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 13/489,365

(22) Filed: Jun. 5, 2012

(65) Prior Publication Data

US 2013/0325806 A1 Dec. 5, 2013

(51) Int. Cl.
*G06F 17/30* (2006.01)

(52) U.S. Cl.
USPC ........................................ 707/638

(58) Field of Classification Search
None
See application file for complete search history.

(56) References Cited

U.S. PATENT DOCUMENTS

| | | | |
|---|---|---|---|
| 7,756,844 B2 | 7/2010 | Shoens et al. | |
| 7,818,302 B2 | 10/2010 | Godbole | |
| 7,958,325 B2 | 6/2011 | Adkins et al. | |
| 8,010,495 B1 | 8/2011 | Kuznetzov et al. | |
| 8,032,496 B2 | 10/2011 | Sinha et al. | |
| 8,103,843 B2 | 1/2012 | Satoyama et al. | |
| 2011/0093437 A1 | 4/2011 | Sampathkumar | |
| 2011/0161387 A1* | 6/2011 | Krueger et al. | 707/825 |
| 2011/0302195 A1 | 12/2011 | Cai et al. | |
| 2012/0030261 A1 | 2/2012 | Mason, Sr. et al. | |
| 2012/0047126 A1 | 2/2012 | Branscome et al. | |
| 2012/0166868 A1* | 6/2012 | Volvovski et al. | 714/6.22 |

OTHER PUBLICATIONS

IP.COM et al.; "Preserving Point-In-Time Objectives in Block Level Incremental Snapshot Systems-By Cascading Snapshots", IPCOM000200576D, Oct. 19, 2010.
Mate et al.; "Transformation of Relational Databases to Transaction-Time Temporal Databases", ECBS-EERC IEEE Regional Conference on, Sep. 5-6, 2011, pp. 27-34.

* cited by examiner

*Primary Examiner* — Belix M Ortiz Ditren
(74) *Attorney, Agent, or Firm* — Griffiths & Seaton PLLC

(57) ABSTRACT

Selective tuple versioning is used on a file system providing file system snapshots using selective tuple versioning for maintaining the state of the file system. The selective tuple versioning works by adding a snapshot table to associate with a file system table by storing a timestamp and a snapshot identification (ID) relating to a snapshot created for preserving past nodes in the file system.

24 Claims, 9 Drawing Sheets

500

Before Update

| Node Id | Start Time | End Time | Bitmap | Size | Etc .... |
|---|---|---|---|---|---|
| 1 | T1 | ∞ | 0000 | 100 | |
| 2 | T3 | ∞ | 0001 | 100 | |
| 3 | T4 | ∞ | 0000 | 100 | |

| Snapshot Id | Snapshot time |
|---|---|
| 1 | T2 |

After Update

| Node Id | Start Time | End Time | Bitmap | Size | Etc .... |
|---|---|---|---|---|---|
| 1 | T1 | T5 | 0000 | 100 | |
| 1 | T5 | ∞ | 0000 | 200 | |
| 2 | T2 | T6 | 0001 | 100 | |
| 2 | T6 | ∞ | 0000 | 200 | |
| 3 | T7 | ∞ | 0000 | 200 | |

FIG. 5

PRESERVING A STATE USING SNAPSHOTS WITH SELECTIVE TUPLE VERSIONING

BACKGROUND OF THE INVENTION

1. Field of the Invention

The present invention relates generally to computers, and more particularly, to providing file system snapshots using selective tuple versioning for maintaining the state of the file system.

2. Description of the Related Art

In today's society, computer systems are commonplace. Computer systems may be found in the workplace, at home, or at school. Computer systems may include data storage systems, or disk storage systems, to process and store data. Within various computing environments, computer systems contain file systems that are used to "file away" information, which a user will later retrieve for processing. A file system is a method or data structure for organizing and managing computer files. A file system provides a better way for organizing files on the computer, physically and logically. One of the known methods for an implementation of a file system is by using a relational database. Due to various factors, challenges arise in maintaining the state of the file system within the computing environment.

SUMMARY OF THE INVENTION

As mentioned above, a file system is a method or data structure for organizing and managing computer files. One of the known methods for an implementation of a file system is using a relational database. A file system database implementation offers file system users and developers advanced, scalable features of the relational database system. Such features include efficient transactions and queries that involve multiple nodes (e.g. files/directories) in the file system. Given these features, along with other features not mentioned, a need exists for a file system database implementation using snapshots for maintaining the state of the file system for a certain point in time within the computing environment.

Accordingly, and in view of the foregoing, various exemplary method, system, and computer program product embodiments providing file system snapshots using selective tuple versioning for maintaining the state of the file system are provided. The snapshot table contains a single entry for each snapshot indicating the time of the snapshot. The files/directories, which are under the snapshot, are maintained in the main file system table for that particular file system, along with the rows, which are not under the snapshot. The additional snapshot table, which stores a single entry for each snapshot, contains a snapshot identification (ID) and a snapshot time stamp. In other words, selective tuple versioning is used on a file system by adding a snapshot table to associate with a file system table by storing in the snapshot table rows that contains a snapshot timestamp relating to a snapshot created for preserving past states of nodes in a file system.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 5 is a block diagram illustrating an exemplary File system and snapshot tables using selective tuple versioning for preserving a state of the file system.

DETAILED DESCRIPTION OF THE DRAWINGS

Figure 1:
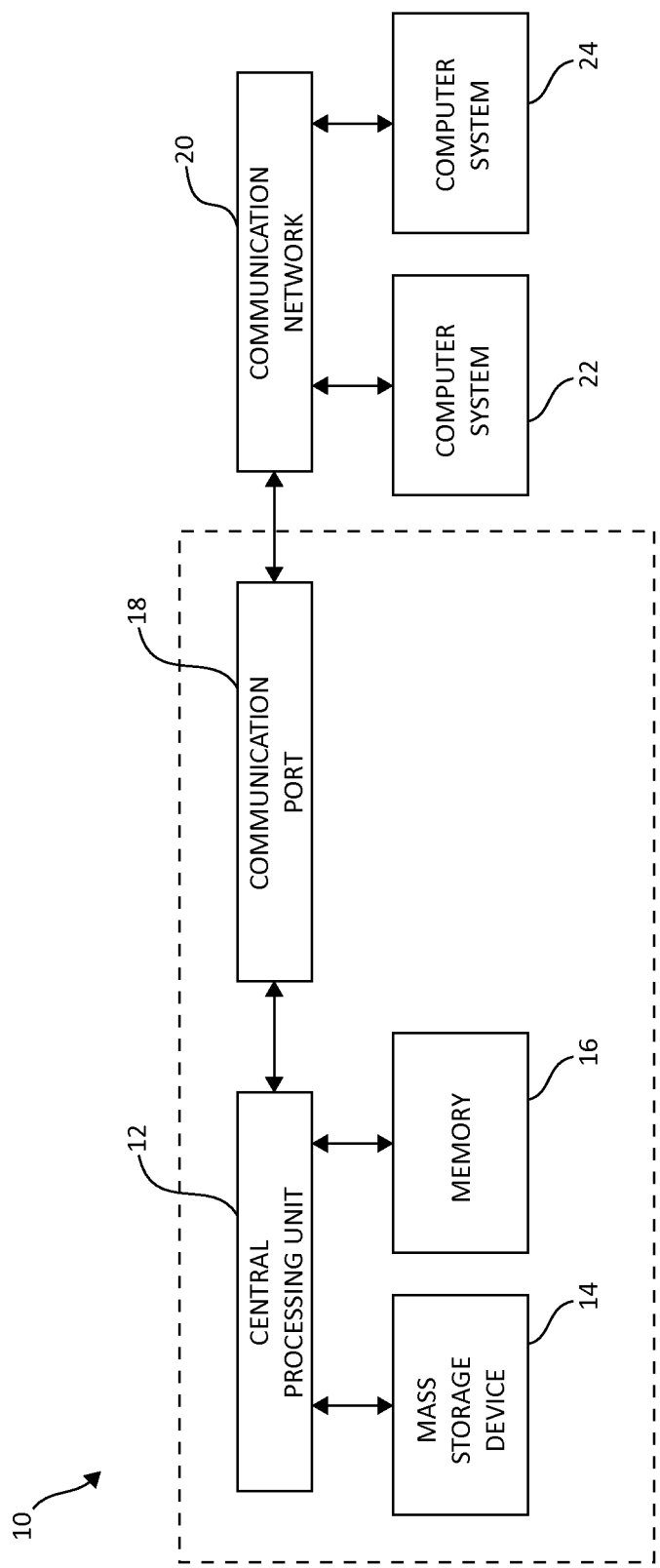
FIG. 1 is a block diagram illustrating a computing system environment having an example storage device in which aspects of the present invention may be realized.

A file system is a container of nodes and a node is a generic name for a file/directory. A file system table represents the file system and a node is represented as a row that is contained within the file system table. File systems may contain a large number of nodes. A file system database implementation offers file system users and developers advanced, scalable features of the relational database system. Such features include efficient transactions and queries that involve multiple nodes (e.g. files/directories) in the file system.

It is often required by applications to maintain the state of a file system at a certain point in time. Therefore, a need exists for providing file system snapshots using selective tuple versioning on a file system for maintaining the state of the file system (e.g., a container of nodes) within the computing environment. A need also exists for using selective tuple versioning on a file system by adding a bitmap to a row for a node within a file system table for preserving a past state of the node. To address these needs, the computing system must satisfy the following requirements. (1) The computing system should enable preserving a state of the file system at a certain point in time using a snapshot for preserving the state of the file system. (2) The computing system should enable preserving a node of the file system at a certain point in time. (3) The computing system should enable access to the file system and/or nodes preserved by the snapshot and/or bitmap. (4) When creating a snapshot the computing system should require constant time and input/output (I/O) complexity and consume a constant amount of storage space. (5) During the lifetime of the snapshot, the overhead of preserving the snapshot of the file system must not add more than a small constant factor to the regular cost of file system for manipulation operations. Also, the space consumed by the snapshot should be a function of the number of nodes changed between the creation of the snapshot and the current state of the file system (e.g., a node that was changed twice since the time the snapshot was created should only be preserved once). (6) A snapshot deletion must require time and I/O complexity as a function of the number of nodes preserved by the snapshot and redeem all the space taken by the nodes preserved by the snapshot.

To address the requirements listed above, the illustrated embodiments seek to provide a file system snapshot for preserving the state of a file system (e.g., a container of nodes) in a file system table at a single point in time. Finely grained snapshot are required for preserving the state of a file system (e.g., a container of nodes) per request. As such, a file system snapshot implementation must be scalable and efficient in terms of complexity and space consumption. The implication of the preservation is that if a node, which was created prior to the time the snapshot was taken, is modified, than the state existing prior to the snapshot creation is preserved. The snapshot is implemented with a snapshot table. The snapshot table contains the times the snapshots were created and does not contain any information about the file system or the file system nodes. The snapshot table stores a single entry for each snapshot, which contains a snapshot identification (ID) and a snapshot timestamp.

Furthermore, in an alternative embodiment, selective tuple versioning is used on a file system by adding a bitmap to a file system table for preserving the state of a singular node. As mentioned previously, a file system is a table containing all nodes in the files system, including the root directory of the file system. Node rows under the various snapshots are stored in a file system table, next to the rows, which are not under snapshot. All rows in the file system table contain a start time and an end time. The creation of a snapshot does not immediately affect the rows in the file system table because only when a row is updated in the file system table is the row duplicated. The creation of a snapshot adds a new row to the snapshot table. Later, when a row that is under a snapshot in the file system table is updated (as deduced using the start time, end time, and the snapshot timestamp), the row is duplicated instead of being updated in place. Once a snapshot is created, the file system allows for accessing the nodes preserved by the snapshot. The file system allows for deleting the snapshot and redeeming all the space previously occupied by the file system (and/or nodes) preserved by the snapshot.

In one embodiment, by way of example only, file system nodes are stored in a table. The table row contains a unique identifier (e.g., node id) for each node including node attributes such as name, size, creation time, etc. The file system entries are not held in the database. Rather, the file system table contains the entries of the nodes in the file system (including the node representing the root directory of the file system). In other words, when a file system is created, the file system is created as a table that contains only the root node. Later, other nodes are created as decedents of the root node. To maintain the file system tree hierarchy there may be a reference from each node to the parent node by holding the parent ID in each row of the node. Upon this framework, selective tuple versioning is used and adapts the tuple versioning for a file system snapshot and bitmap implementation and is referred to as selective tuple versioning. The selective tuple versioning assists with preserving the past states of the rows and/or singular node in a dimension. A dimension may be defined as the logical groupings of data (e.g., customers/product data).

In one embodiment, the preservation for using the tuple versioning for maintaining the state of the file system and single node is implemented by adding a start and end time to each row that defines the period of time for which the row is valid. When a new row is added to the table, the start time contains the time the new row was added and the end time of the row is set to infinity ($\infty$). For retrieving current entries in the file system table, rows with end times equal to infinity are queried. When a row is updated at time "T" (where "T" is an arbitrary time variable used as an example), the row is duplicated forming a new row and the new row's start time is set equal to time "T". The row to be updated is the new row with an end time set to infinity. The old row's end time is updated and set equal to time "T". To retrieve the entries in the node table, which are relevant to time "T", the rows having a start time that is less than time "T" and end time that is greater than "T" (e.g., start time<T and end time is >T) are queried.

In order to maintain the state of the file system selective tuple versioning is applied. The selective tuple versioning enables the "selectiveness" of the tuple versioning by requiring additional information to be added to the database. The selective tuple versioning enables the selectiveness so that not all of the rows in the table will be automatically duplicated, but rather, only duplicating rows which related to a snapshot. First, a "snapshot table" is added to the database. In other words, additional rows are added to a snapshot table and work in conjunction with a node ID table. The snapshot table contains the times when snapshots are taken, and specifically, the rows in the snapshot table contain the snapshot timestamps. All other information relating to the snapshot (e.g., the nodes related to the snapshot) is maintained in the main file system table. Also, in order to enable the preservation of a single node, an additional field is added to each row relating to a specific node in order to indicate whether the node should or should not be preserved. The new field may be represented as a bit in which each bit refers to an application using the node. The bitmap allows for specifically choosing which nodes to preserve as compared to the snapshot table, which preserves all the nodes before an arbitrary time "T". The bitmap is used, rather than a simple Boolean flag or a reference count, in order to allow for multiple applications to independently preserve the single node from each other by assigning each application a different bit. Moreover, a bitmap, in contrast to reference count, is tolerant of applications attempting to preserve or unpreserve the same node more than once.

With the additional information in the snapshot table and/or the bitmap in the file system table, a determination may be made as to when a row is to be preserved by checking if the start time of the row, relating to a specific node, is earlier than the time when a snapshot was taken or when one of the bits in the row is turned on (e.g., set to a "1" for on).

In one embodiment, access to the file system's nodes that are preserved by the snapshot is allowed by using a snapshot identification (ID) that relates to the snapshot. In an alternative embodiment, access to the single node that is preserved by the bitmap is allowed by using a start time in the row, relating to a specific node. The snapshot ID provides access to the snapshots table time for accessing when the snapshot was created. The nodes, which are relevant to a snapshot, have start times in the row that are less than the snapshot timestamp and end times in the rows that are greater than the snapshot timestamp.

On the other hand, as mentioned above, a specific node in the file system table is preserved by a bitmap and may be accessed by the start time in the row, relating to the specific node. Rows preserved by the bitmap are accessed similarly to rows preserved by the snapshot by using time "T", which is less than the start time of the row and greater than to the end time of the row. A snapshot may be deleted by removing the snapshot row from the snapshots table and by removing all of the nodes that are associated with the deleted snapshot (e.g., the nodes' end times are less than infinity and no other snapshots were created following the creation of the nodes and each of the node's bitmap are set at zero "0").

For each newly created node, the start times and end times are added to each row in the main file system table. However, the snapshot table only contains entries with the different snapshot times. The combination of adding the start time and end time to each row in the file-system table, and holding a snapshot table, preserves the state of the file system at a certain point in time. On the other hand, the bitmap in the file system table is used for preserving the state of a singular node at a certain point in time. A snapshot Id is used for accessing the file system nodes preserved by the snapshot. Since a snapshot creation only involves adding a single row to a snapshot table, constant complexity in time and I/O operations is allowed and use of a constant amount of storage space is permitted. The state of the node is preserved during the lifetime of the snapshot by one query to the snapshot table and another to the file system main table by duplicating the row relating to a specific node. The snapshot table can be assumed to be significantly less in size than the node table so the overhead relating to the snapshot table lookup operation is considered minor. The duplication of the preserved row adds a row insertion to the file system table for an update transaction. Since the insertion and update are done in a single database transaction, the operations are efficiently performed.

In addition, a file system (e.g., a container of nodes) is preserved once by the same snapshot, since after the first update, the file system's start time will be later (e.g. after) than the snapshot time (e.g., a snapshot timestamp). Such an operation allows for consuming space as a function of the number of nodes changed between the snapshot and the current state of the file system (e.g., a node that was changed twice since the time the snapshot was created should only be preserved once).

A snapshot may also be deleted. In so doing, the snapshot is deleted from the row from the snapshot table and a query is performed that removes from the file system table the nodes that are no longer referenced by any other snapshot. Since removing the snapshot from the snapshot table and removing the nodes from file system table may be performed in a single transaction, most database systems will require significantly less I/O operations than the number of nodes preserved by the snapshot. Also, following the snapshot deletion operation, all the space consumed by the nodes preserved by the snapshot shall be redeemed. Also, it should be noted that the bitmap is not directly connected to the snapshot and is used to achieve selective tuple versioning. The bitmap allows for more finegrained preservation on a single node level.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signalbearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
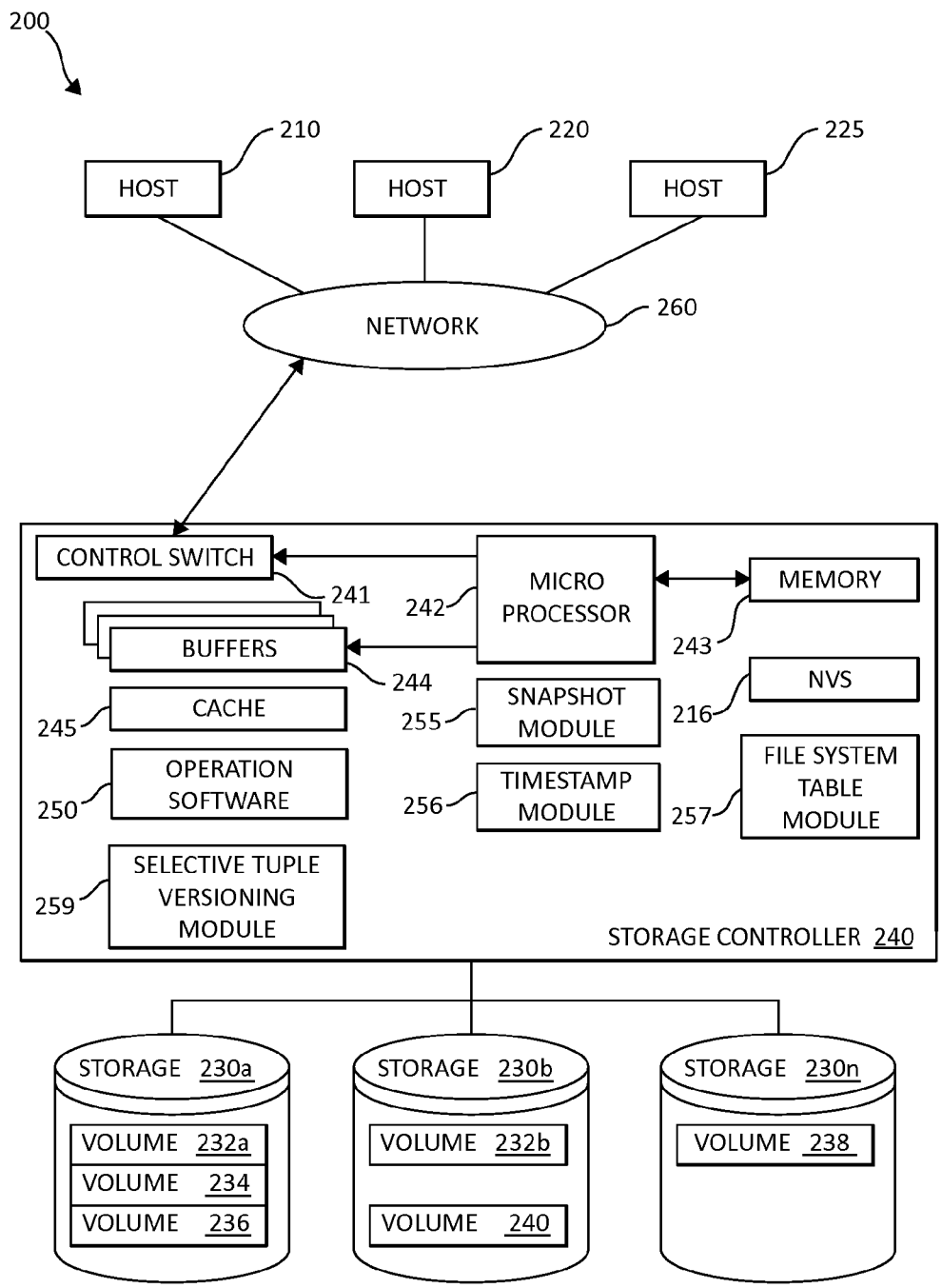
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a snapshot module 255, a timestamp module 256, a main file system table module 257, and a selective tuple versioning module 259. The main file system table module 257 contains the nodes under snapshot. The snapshot module 255, the timestamp module 256, the main file system table module 257, and the selective tuple versioning module 259 may work in conjunction with each and every component of the storage controller 240, the hosts 210, 220, 225, and storage devices 230. The snapshot module 255, the timestamp module 256, the main file system table module 257, and the selective tuple versioning module 259 may be structurally one complete module or may be associated and/or included with other individual modules. The snapshot module 255, the timestamp module 256, the main file system table module 257, and the selective tuple versioning module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, the snapshot module 255, the timestamp module 256, the main file system table module 257, and the selective tuple versioning module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, snapshot module 255, the timestamp module 256, the main file system table module 257, and the selective tuple versioning module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the snapshot module 255, the timestamp module 256, the main file system table module 257, and the selective tuple versioning module 259 may also be located in the cache 245 or other components. As such, one or more snapshot module 255, the timestamp module 256, the main file system table module 257, and the selective tuple versioning module 259 maybe used as needed, based upon the storage architecture and users preferences.

Figure 3:
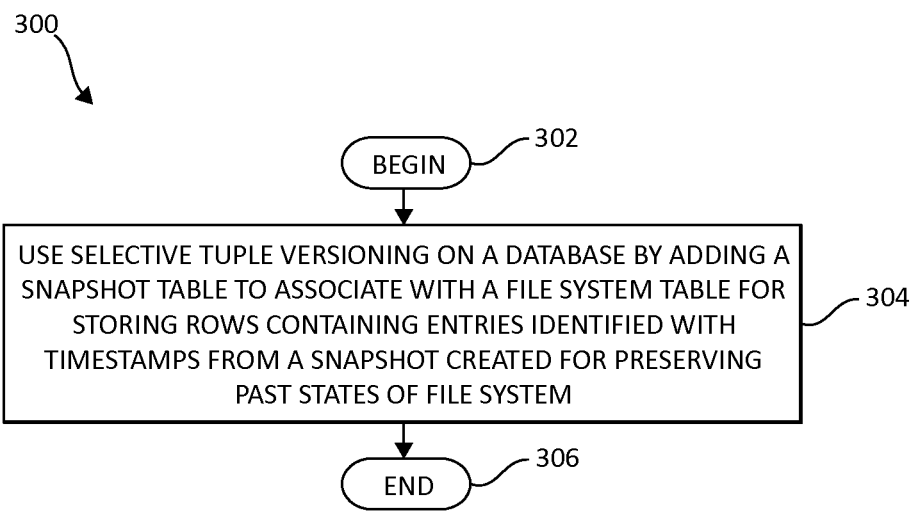
FIG. 3 is a flow chart diagram illustrating an exemplary method for providing file system snapshots using selective tuple versioning.

Turning now to FIG. 3, a flowchart illustrating an exemplary method 300 for providing file system snapshots using selective tuple versioning is illustrated. The method 300 begins (step 302) by using selective tuple versioning on a file system table by adding a snapshot table, to associate with a file system table, for storing snapshots (e.g., each with a snapshot ID and respective snapshot timestamp) containing a single entry for each snapshot with the snapshot timestamp (step 304). The nodes under the snapshot are contained in a main file system table. The method 300 ends (step 306). stores the snapshots (each as and ID and respective snapshot timestamp).

To assist with providing file system snapshots using selective tuple versioning for maintaining the state of the file system, various time stamps (e.g., the start time stamp, end time stamps, and the snapshots timestamps) used by the file system a container of nodes) are generated. Timestamps are generated by utilizing a strictly increasing (monotonic) function over time. In such a function (f), if time "$T_1$" is greater than time "$T_2$" (e.g., $T_1 > T_2$), then the function $f(T_1)$ is greater than or equal to $f(T_2)$ (e.g., $f(T_1) \geq f(T_2)$), where f is the function, $T_1$ is a first time and $T_2$ is a second time period.) Hence, the timestamps generated are unique and will never decrease over time, but rather increase over time. A time value of infinity ($\infty$) may be defined by using "null" and/or the maximum value a time counter may hold.

Figure 4A:
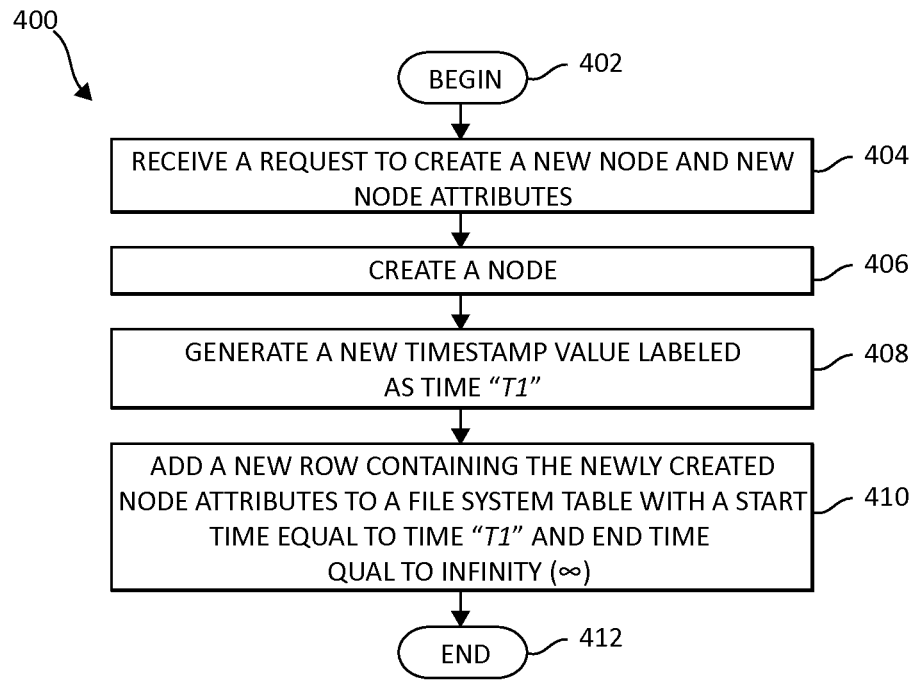
FIG. 4A is a flow chart diagram illustrating an exemplary method for creating a node.

The procedure for providing file system snapshots using selective tuple versioning for maintaining the state of the file system using the various file system operations and are described below. The procedure for providing a bitmap using selective tuple versioning for maintaining the state of a single node using the various file system operations are also described as follows. FIG. 4A is a flow chart diagram illustrating an exemplary method 400 for creating a node. The method 400 begins (step 402) by receiving a request to create a new node along with the node attributes (step 404). A node is created in the file system table (step 406). A new timestamp value labeled as time "$T_1$" is generated (step 408). A new row containing the newly created file system's attributes is added to the files system table with start time equal to time "$T_1$" (e.g., start time=$T_1$) and end time equal to infinity (e.g., end time=$\infty$) (step 410). The method 400 ends (step 412).

Figure 4B:
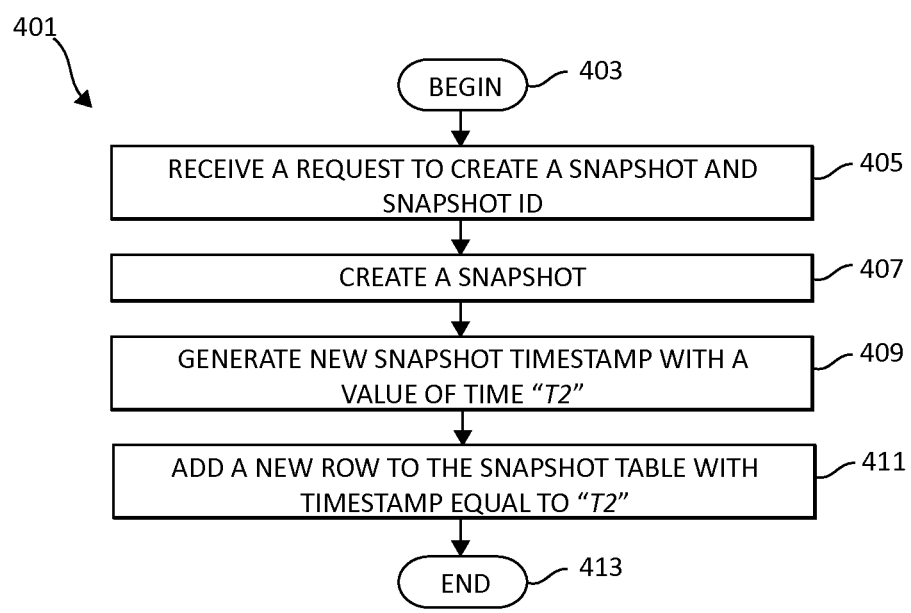
FIG. 4B is a flow chart diagram illustrating an exemplary method for creating a snapshot.

FIG. 4B is a flow chart diagram illustrating an exemplary method 401 for creating a snapshot. The method 401 begins (step 403). A request, along with a snapshot Id, to create a snapshot is received (step 405). The method 401 may create a snapshot (step 407). A new snapshot timestamp value of time "$T_2$" is generated (step 409). A new row is added to the snapshot table with timestamp set equal to "$T_2$" (e.g., time=$T_2$) (step 411). The method 401 ends (step 413).

Figure 4C:
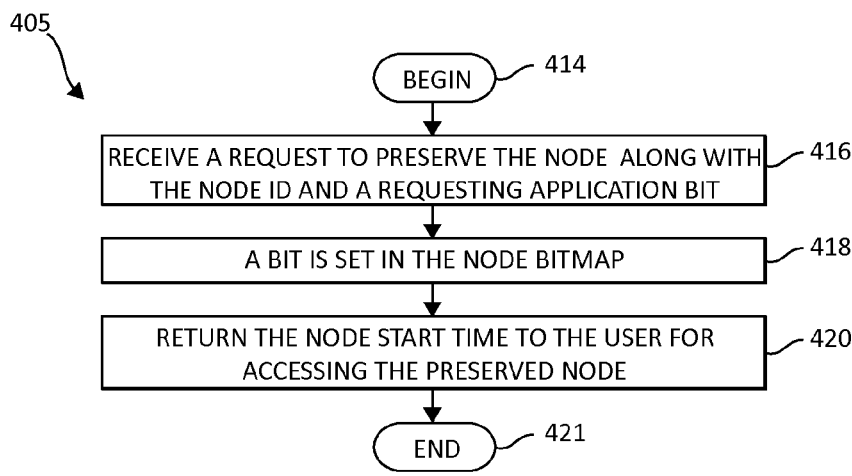
FIG. 4C is a flow chart diagram illustrating an exemplary method for requesting to preserve a node.

FIG. 4C is a flow chart diagram illustrating an exemplary method 405 for requesting to preserve a node. The method 405 begins (step 414). The method 405 may receive a request to preserve a specific node along with the node ID and a requesting application bit (step 416). The request to preserve a specific node is only relevant for the bitmap. It should be noted that the preservation using a snapshot is performed when the snapshot is created. A bit is set in the node bitmap (step 418). The node start time is returned to the user to be able to access the preserved node at a later time (step 420). The method 405 ends (step 421).

Figure 4D:
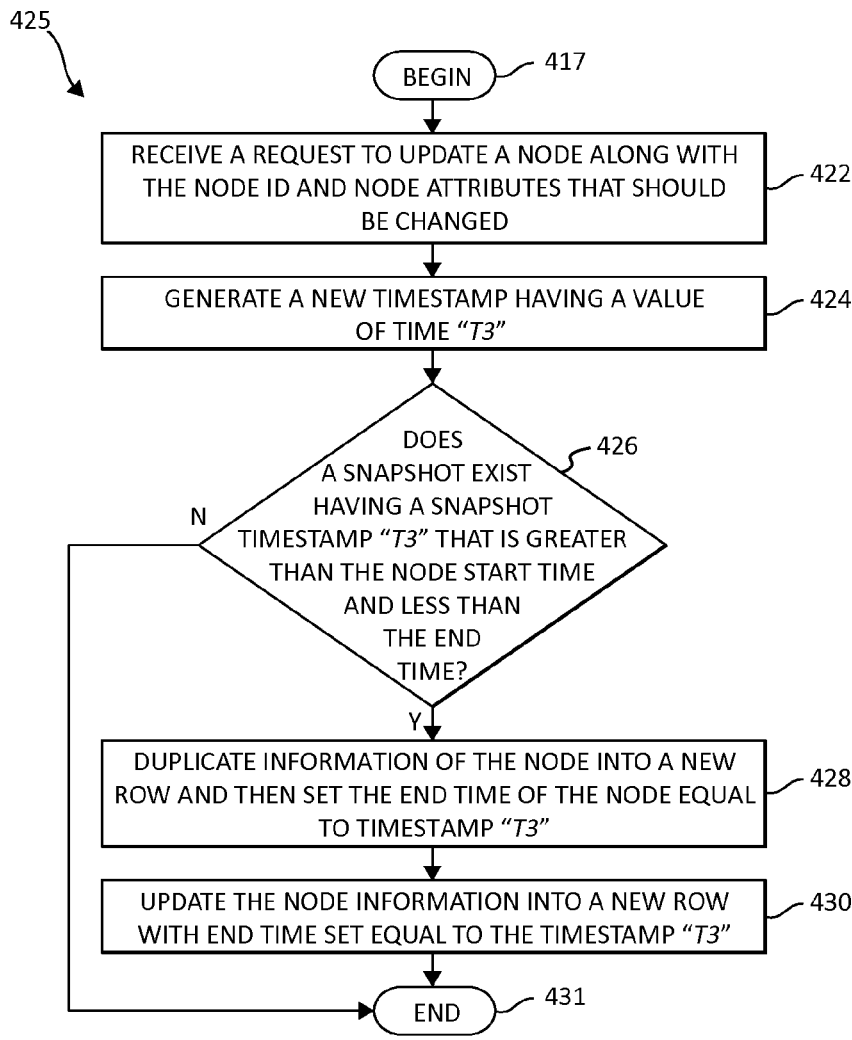
FIG. 4D is a flow chart diagram illustrating an exemplary method for updating a node.

FIG. 4D is a flow chart diagram illustrating an exemplary method 425 for updating a node. The method 425 begins (step 417) and may receive a request to update a node along with the node ID and node attributes that should be changed (step 422). A new timestamp value of time "$T_3$" is generated (step 424). The method 425 then determines if the node bitmap has a bit set, or a snapshot exists in which the snapshots time "$T_3$" is greater than the node's start time and less than the node's end time that are in the file system table (step 426). If yes, the node information is duplicated into a new row with end time of the old row of the node is set equal to "$T_3$" (e.g., end time=$T_3$) (step 428). The new row relating to the node is updated according to the update request and the updated row start time is set equal to time "$T_3$" and the updated row bitmap may be cleared (step 430). If no, the method 425 ends (step 431).

Figure 4E:
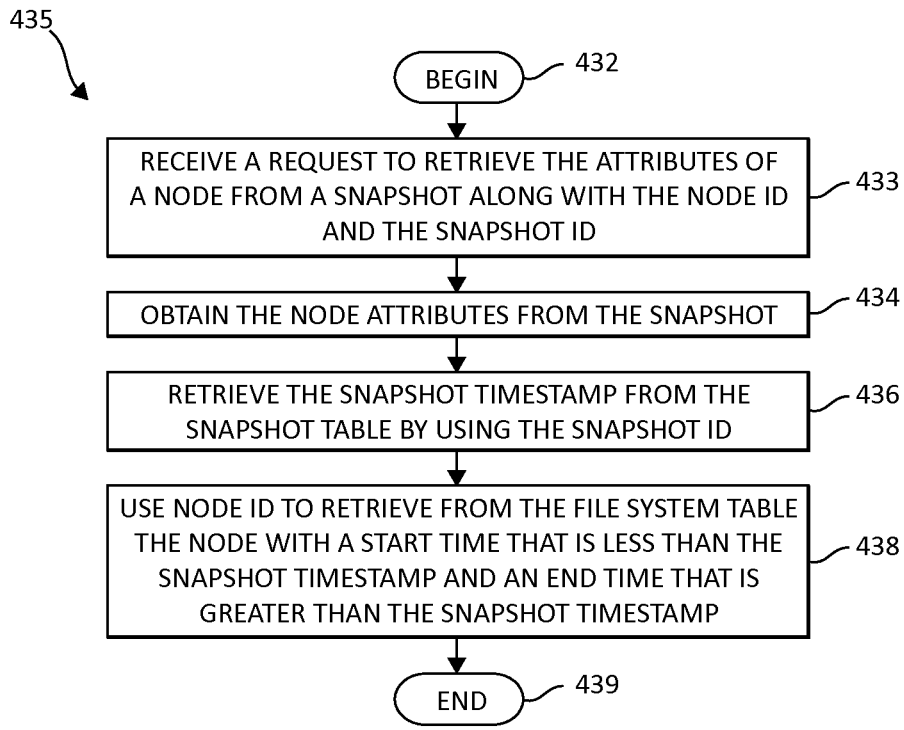
FIG. 4E is a flow chart diagram illustrating an exemplary method for retrieving attributes of a node.

FIG. 4E is a flow chart diagram illustrating an exemplary method 435 for retrieving attributes of a node from a snapshot. The method 435 begins (step 432) may receive a request to retrieve the attributes of a node from a snapshot along with a node ID the snapshot ID (step 433). The snapshot timestamp is retrieved from the snapshot table by using the snapshot ID (step 436). The method 435 uses the node ID to retrieve from the file system table the node (e.g. attributes) with a start time that is less than the snapshot timestamp and an end time that is greater than the snapshot timestamp (step 438). The method 435 ends (step 439).

Figure 4F:
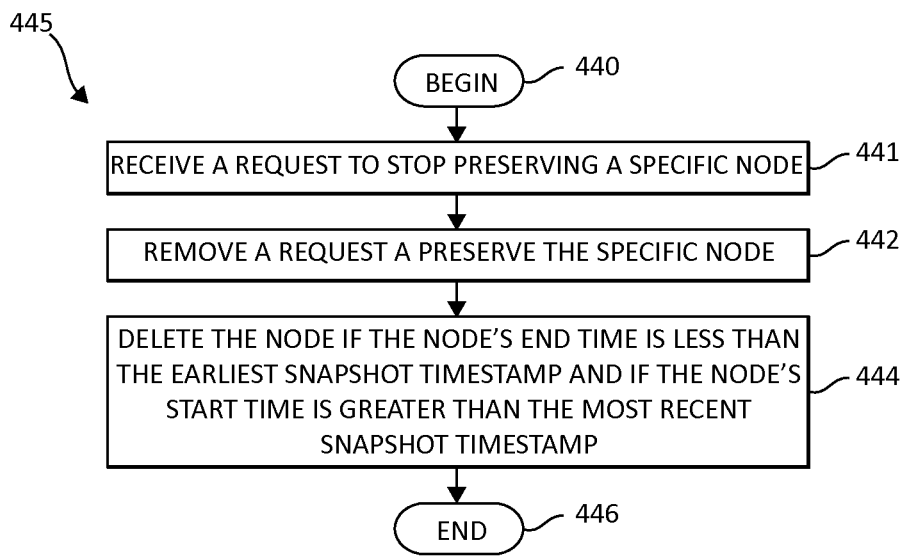
FIG. 4F is a flow chart diagram illustrating an exemplary method for removing a request to preserve a specific node.

FIG. 4F is a flow chart diagram illustrating an exemplary method 445 for removing a request to preserve a specific node. The method 445 begins (step 440) and may receive a request, which includes a node Id, a requesting application bit, and a node start time, to stop preserving a node (step 441). The method 445 removes the request to preserve a specific node (step 442). A bit may be unset in the bitmap in the file system table. If the node's bitmap was cleared and the node's end time is different than infinity, the node's row is deleted if the node's end time is less than the earliest snapshot timestamp in the snapshot table, or if the node's start time is greater than the most recent snapshot timestamp in the snapshot table (step 444). The method 445 ends (step 446).

Figure 4G:
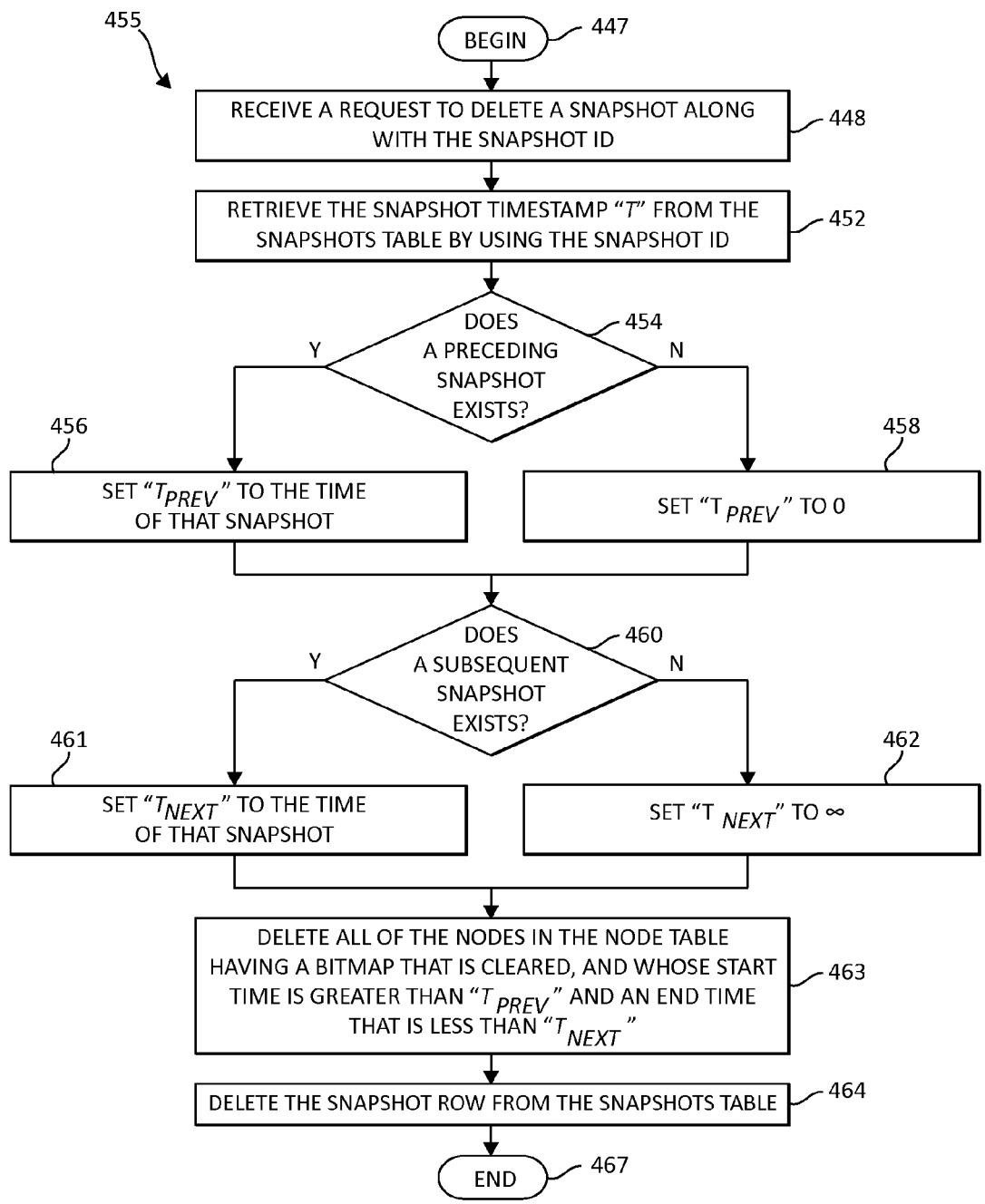
FIG. 4G is a flow chart diagram illustrating an exemplary method for deleting a snapshot.

FIG. 4G is a flow chart diagram illustrating an exemplary method 455 for deleting a snapshot. The method 455 begins (step 447) and may receive a request to delete a snapshot along with the snapshot ID (step 448). The method 455 may delete a snapshot (step 450). The method 455 may retrieve the snapshots timestamp "T" from the snapshots table by using the snapshot ID (step 452). The method 455 checks to see if there are snapshots that precede the snapshot that is to be deleted (step 454). If yes, the method 455 sets "$T_{prev}$" to the time of the previous snapshot (step 456). If no preceding snapshot exists, $T_{prev}$ is set to zero "0" (step 458). The method 455 checks to see if there are snapshots that are subsequent to the snapshot to be deleted (step 460). If yes, "$T_{next}$" is set to the time of the subsequent snapshot (step 461). If no subsequent snapshot exists, $T_{next}$ is set to infinity "$\infty$" (step 462). The method 455 may delete each of the nodes in the node table having a bitmap that is cleared, and whose start time is greater than $T_{prev}$ and their end time is less than $T_{next}$ (step 463). The snapshot row is deleted from the snapshots table (step 464). The method 455 ends (step 461).

Figure 4H:
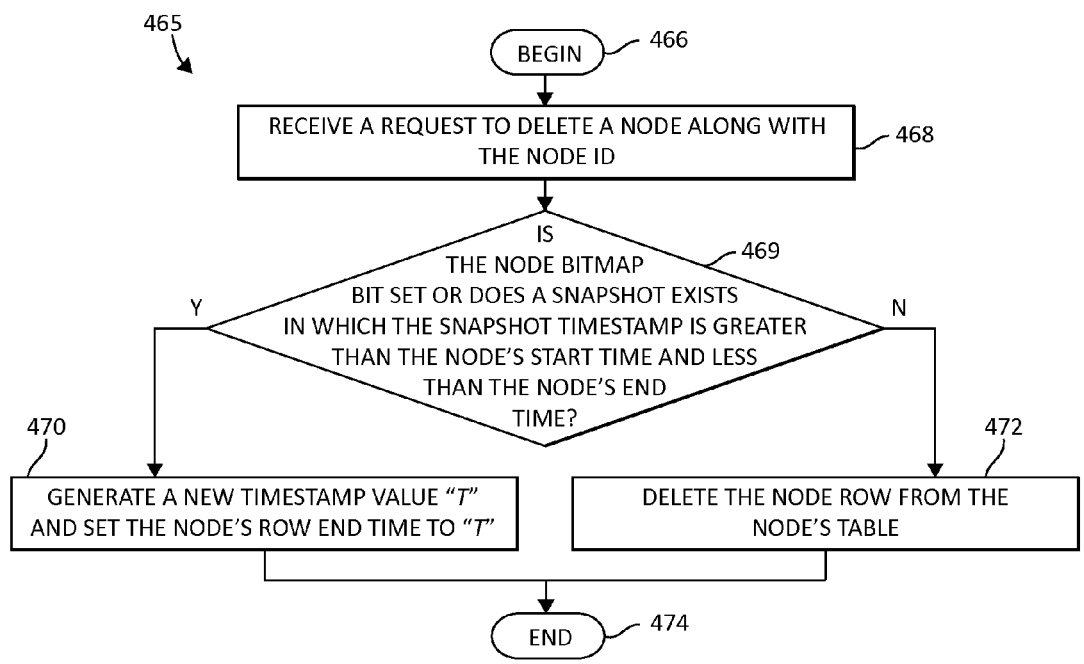
FIG. 4H is a flow chart diagram illustrating an exemplary method for deleting a node.

FIG. 4H is a flow chart diagram illustrating an exemplary method 465 for deleting a node. The method 465 begins (step 466) and may receive a request to delete a node along with the node ID (step 468). The method 465 checks to see if the node bitmap has a bit set, and/or, if a snapshot exits in which the snapshot timestamp is greater than the node's start time and less than the node's end time (step 469). If yes, a new timestamp value "T" is generated and the node's row end time is set to "T" (step 470). If no, the node row is deleted from the node's table (step 472). The method 465 ends (step 474).

FIG. 5 is a block diagram 500 illustrating an exemplary file system table and snapshot table using selective tuple versioning for preserving a state of the file system. Within FIG. 5, a file system table and snapshot table is depicted and labeled including a "before update" and an "after update". In the "before update" file system table, a column for node identification (ID) (e.g., file system ID), start time, end time, bitmap, size, and other miscellaneous entries are illustrated (shown in the diagram as "etc."). By way of example, FIG. 5 illustrates the "before update" file system table with Node 1, 2, and 3 being added to the file system table. Node 1 has a start time of $T_1$, an end time set to infinity ($\infty$), bits in the bitmap set equal to 0000, and the size of the node illustrates an arbitrary value of 100 (shown here only as an example). Node 2 has a start time of $T_2$, an end time set to infinity ($\infty$), bits in the bitmap set equal to 0001, and the size illustrates an arbitrary value of 100 (shown here only as an example). Node 3 has a start time of $T_3$, an end time set to infinity ($\infty$), bits in the bitmap set equal to 0000, and the size of the node illustrates an arbitrary value of 100 (shown here only as an example). A snapshot table includes at least two columns labeled as snapshot ID and snapshot time for the snapshot timestamp. The snapshot ID indicates an arbitrary value set equal to one "1" and the snapshot time is set equal to $T_2$. No two-snapshot timestamps are identical. The order between the time stamps may be that $T_1$ is less than $T_2$, and $T_2$ is less than $T_3$ (e.g., $T_1 < T_2 < T_3$) and the snapshot time stamp can be marked as "$T_s$," and $T_s$ is greater than $T_1$ and less than $T_2$ (e.g., $T_s > T_1$ and $< T_2$).

By way of example, FIG. 5 also illustrates the "after update" file system table with Nodes 1, 2, and 3 being updated. In node 1, the state was preserved since node 1 was under a snapshot (e.g., snapshot timestamp). Node 2's state was preserved since node 2 has a bit set to "on" (e.g., the bit set to 0001) by using the bitmap. However, the state of Node 3 was not preserved because it was neither under a snapshot (e.g., snapshot timestamp) nor preserved by use of a bitmap with the bit turned on (e.g., set to 0001).

For node 1, a duplicate row for node 1 was created and values for the duplicated node 1 has a start time of $T_1$, an end time set to $T_5$, bits in the bitmap set equal to 0000, and the size of the node illustrates an arbitrary value of 100 (shown here only as an example). Now, after the update, the preserved node 1 has a start time of $T_5$, an end time set to $\infty$, bits in the bitmap set equal to 0000, and the size of the node illustrates an arbitrary value of 200 (shown here only as an example).

For node 2, a duplicate row for node 2 was created and values for the duplicated node 2 has a start time of $T_2$, an end time set to $T_6$, bits in the bitmap set equal to 0001, and the size of the node illustrates an arbitrary value of 100 (shown here only as an example). Now, after the update, the preserved node 2 has a start time of $T_6$, an end time set to $\infty$, bits in the bitmap are cleared and set equal to 0000, and the size of the node illustrates an arbitrary value of 200 (shown here only as an example).

The state of node 3 was not preserved because node 3 was neither under a snapshot (e.g., snapshot timestamp) nor preserved by use of a bitmap with the bit turned on (e.g., set to 0001). No duplication occurred for node 3, and after the update, node 3 has a start time of $T_7$, and end time set to $\infty$, bits in the bitmap set equal to 0000, and the size of the node illustrates an arbitrary value of 200 (shown here only as an example).

As illustrated in FIG. 5, selective tuple versioning is used on the file system table by adding a snapshot table to associate with a file system table for storing rows in the file system table relating to a node. The node rows are stored only in the file system table and the snapshot table is used to store the snapshot requests and hold the time the snapshots are taken. The file system table contains rows with entries identified with timestamps relating to the snapshot created for preserving past states of the file system. A snapshot identification (ID) associated with the snapshot is added to the snapshot table for accessing a specific snapshot. The file system table only contains data about the nodes contained inside the file system. A start time and an end time are added to a row that is associated with a new node in the file system table. The start time is set equal to the time when the new row was added to the file system table. The end time is set equal to infinity. In other words, each row in the file system table contains a start time and an end time. When a row for the node is added to the file system table (at time "T") the node's start time is set to "T" and the end time is set to infinity.

A snapshot timestamp is added to one of the entries of a new row created in the snapshot table when a snapshot is taken. The snapshot preserves all of the nodes in the file system table that were created prior to the snapshot creation. The bitmap is used to preserve a single node and not the entire file system (e.g., a container of nodes). The file system table may be updated and/or a request may be received for removing the request to preserve the state of the file system and/or a specific node. A new field is added to each row of a node in the file system table for indicating whether the node should be preserved. As part of the preservation, a bit in the field may be set for preserving the node in response to receiving a request to preserve the node. The bit refers to an application using the node. As part of the request for preserving the node, a request to preserve the node is received along with a node identification (ID) and a bit for requesting to preserve the node. The snapshot identification (ID) is returned to a user to access the node that is preserved. When a node using the bitmap is preserved, the value returned to the user is the current time of the preservation, to allow the user to access the preserved row. The snapshot ID is assigned during the snapshot creation and allows the user to access all of the rows that were preserved by the snapshot.

A request may also be received for updating the node along with a node ID and associated attributes of the node needing to be updated. A request can only update one node at a time. In other words, multiple rows are not updated at once, but rather, the rows are updated one at a time, per a request. A new timestamp indicating the time of the updating is generated. In conjunction with the updating, the row associated with the node that is to be updated is duplicated into a new row with an end time set equal to the new timestamp that is generated. The duplication is only performed if a snapshot exists with a snapshot timestamp that is greater than a start time of the node and less than the end time of the node. The start time of the node is set equal to the new timestamp.

At any point in time, a request may be received for requesting to delete the snapshot. Upon receipt of the request for deleting the snapshot, the snapshot and the snapshot identification (ID) are deleted. Also, a query is performed for removing nodes that were preserved by the deleted snapshot and are not associated with any other snapshot from the snapshots table.

Also, as part of receiving a request for deleting the snapshot and the snapshot identification (ID), the snapshot timestamp is retrieved from the snapshot table by using the snapshot ID. A timestamp of a preceding snapshot (e.g., the snapshot that preceded the snapshot to be deleted and is labeled as "$T_{prev}$") and a timestamp of a subsequent snapshot (e.g., the snapshot that was subsequent to the snapshot to be deleted and is labeled as "$T_{next}$") is retrieved. If the preceding snapshot to the snapshot that is to be deleted is not found in the snapshot table, a timestamp marked as "$T_{prev}$" (and/or "preceding") is set to a value of zero. If the subsequent snapshot to the snapshot that is to be deleted is not found in the snapshot table, a timestamp marked as "$T_{next}$" (and/or "subsequent") is set to a value of infinity. The snapshot and the rows associated with the snapshot that are related to the file system, which have a start time that is greater than the timestamp of the preceding snapshot and an end timestamp that is less than the timestamp of the subsequent snapshot, are deleted.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for providing file system snapshots using selective tuple versioning in a computing environment using a processor device, comprising:

using the selective tuple versioning on a file system table by adding a snapshot table, to associate with the file system table, and storing in the snapshot table a plurality of rows each containing a snapshot timestamp relating to a snapshot created for preserving past states of a plurality of nodes in a file system, wherein rows of the plurality of nodes under the snapshot are maintained in the file system table, receiving a request for updating at least one of the plurality of nodes and at least a node identification (ID) and associated attributes of the plurality of nodes, generating a new snapshot timestamp indicating the time of the updating duplicating one of the rows of the plurality of nodes in the file system table into a new one of the rows of the plurality of nodes in the file system table with an end time set equal to a new snapshot timestamp if the snapshot has the snapshot timestamp that is greater than a start time of the plurality of nodes and less than the end time of the plurality of nodes, and updating the rows of the plurality of nodes in the file system table according to the update request, wherein the start time of the plurality of nodes is set equal to the new snapshot timestamp.

2. The method of claim 1, further including using a snapshot identification (ID) for retrieving the snapshot timestamp for accessing the rows of the plurality of nodes under the snapshot.

3. The method of claim 1, further including, in conjunction using with the selective tuple versioning, performing one of:
creating the plurality of nodes with at least a node identification (ID) and associated attributes, wherein the node identification and the associated attributes are included in the rows of the plurality of nodes in the file system table,
adding a start time and an end time to a new one of a plurality of rows in the file system table, wherein the start time is set equal to the time when the new one of the plurality of rows was added to the file system table and the end time is set equal to infinity, and
adding a new one of the plurality of rows to the snapshot table containing the snapshot ID and the snapshot time stamp upon creation of the snapshot.

4. The method of claim 1, further including relating the snapshot to the plurality of nodes having a start time that is less than the snapshot timestamp and an end time that is greater than the snapshot timestamp.

5. The method of claim 1, further including, performing at least one of:
adding at least one field to each of a plurality of rows in the file system table for indicating whether the plurality of nodes in the file system should be preserved,
requesting to preserve the plurality of nodes by creating the snapshot,
updating the file system with the snapshot, and
removing a request to preserve the file system.

6. The method of claim 1, further including generating the snapshot timestamp at the time of creating the snapshot.

7. The method of claim 1, further including performing at least one of:
deleting the snapshot and a snapshot identification (ID) upon receiving a request for the deleting, and
deleting the plurality of nodes relating to the snapshot and the rows of the plurality of nodes in the file system table upon receiving a request for the deleting, wherein a query is performed for removing the plurality of nodes not associated with any other snapshots from the file system table.

8. The method of claim 7, further including, in conjunction with deleting the snapshot and the snapshot identification, performing at least one of:
receiving a request for deleting the snapshot and the snapshot ID,
retrieving from the snapshot table at least one of a preceding snapshot timestamp, a subsequent snapshot timestamp, and the snapshot timestamp,
if a preceding snapshot to the snapshot that is to be deleted is not found in the snapshot table, setting the preceding snapshot timestamp to a value of zero,
if a subsequent snapshot to the snapshot that is to be deleted is not found in the snapshot table, setting the subsequent snapshot timestamp to a value of infinity, and
deleting the snapshot and the rows of the plurality of nodes in the file system table associated with the snapshot that is related to the plurality of nodes having a start time that is greater than the preceding snapshot timestamp and an end time that is less than the subsequent snapshot timestamp.

9. A system for providing file system snapshots using selective tuple versioning in a computing environment, comprising:
at least one processor device operable in the computing environment, wherein the at least one processor device is adapted for:
using the selective tuple versioning on a file system table by adding a snapshot table, to associate with the file system table, and storing in the snapshot table a plurality of rows each containing a snapshot timestamp relating to a snapshot created for preserving past states of a plurality of nodes in a file system, wherein rows of the plurality of nodes under the snapshot are maintained in the file system table,
receiving a request for updating at least one of the plurality of nodes and at least a node identification (ID) and associated attributes of the plurality of nodes,
generating a new snapshot timestamp indicating the time of the updating
duplicating one of the rows of the plurality of nodes in the file system table into a new one of the rows of the plurality of nodes in the file s stem table with an end time set equal to a new snapshot timestamp if the snapshot has the snapshot timestamp that is greater than a start time of the plurality of nodes and less than the end time of the plurality of nodes, and
updating the rows of the plurality of nodes in the file system table according to the update request, wherein the start time of the plurality of nodes is set equal to the new snapshot timestamp.

10. The system of claim 9, wherein the at least one processor device is further adapted for using a snapshot identification (ID) for retrieving the snapshot timestamp for accessing the rows of the plurality of nodes under the snapshot.

11. The system of claim 9, wherein the at least one processor device is further adapted for, in conjunction using with the selective tuple versioning, performing one of:
creating the plurality of nodes with at least a node identification (ID) and associated attributes, wherein the node identification and the associated attributes are included in the rows of the plurality of nodes in the file system table,
adding a start time and an end time to a new one of a plurality of rows in the file system table, wherein the start time is set equal to the time when the new one of the plurality of rows was added to the file system table and the end time is set equal to infinity, and
adding a new one of the plurality of rows to the snapshot table containing the snapshot ID and the snapshot time stamp upon creation of the snapshot.

12. The system of claim 9, wherein the at least one processor device is further adapted for relating the snapshot to the plurality of nodes having a start time that is less than the snapshot timestamp and an end time that is greater than the snapshot timestamp.

13. The system of claim 9, wherein the at least one processor device is further adapted for performing at least one of:

adding at least one field to each of a plurality of rows in the file system table for indicating whether the plurality of nodes in the file system should be preserved, requesting to preserve the plurality of nodes by creating the snapshot, updating the file system during a lifetime of the snapshot, and removing a request to preserve the file system.

14. The system of claim 9, wherein the at least one processor device is further adapted for generating the snapshot timestamp at the time of creating the snapshot.

15. The system of claim 9, wherein the at least one processor device is further adapted for performing at least one of:
   deleting the snapshot and a snapshot identification (ID) upon receiving a request for the deleting, and
   deleting the at least one file system relating to the snapshot and the plurality of rows associated with the at least one file system upon receiving a request for the deleting, wherein a query is performed for removing the at least one file system not associated with any other snapshots from the file system table.

16. The system of claim 15, wherein the at least one processor device is further adapted for, in conjunction with deleting the snapshot and the snapshot identification, performing at least one of:
   receiving a request for deleting the snapshot and the snapshot ID,
   retrieving from the snapshot table at least one of a preceding snapshot timestamp, a subsequent snapshot timestamp, and a snapshot timestamp, wherein the snapshot timestamp by using the snapshot ID,
   if a preceding snapshot to the snapshot that is to be deleted is not found in the snapshot table, setting a timestamp marked as "previous" to a value of zero,
   if a subsequent snapshot to the snapshot that is to be deleted is not found in the snapshot table, setting a timestamp marked as "subsequent" to a value of infinity, and
   deleting the snapshot and the plurality of rows associated with the snapshot that are related to at least one file system having a start time that is greater than the timestamp of the preceding snapshot and an end time that is less than the timestamp of the subsequent snapshot.

17. A computer program product for providing file system snapshots using selective tuple versioning in a computing environment using a processor device, the computer program product comprising a computer-readable storage medium having computer-readable program code portions stored therein, the computer-readable program code portions comprising:
   a first executable portion for using the selective tuple versioning on a file system table by adding a snapshot table, to associate with the file system table, and storing in the snapshot table a plurality of rows each containing a snapshot timestamp relating to a snapshot created for preserving past states of a plurality of nodes in a file system, wherein rows of the plurality of nodes under the snapshot are maintained in the file system table,
   receiving a request for updating at least one of the plurality of nodes and at least a node identification (ID) and associated attributes of the plurality of nodes,
   generating a new snapshot timestamp indicating the time of the updating,
   duplicating one of the rows of the plurality of nodes in the file s stem table into a new one of the rows of the plurality of nodes in the file system table with an end time set equal to a new snapshot timestamp if the snapshot has the snapshot timestamp that is greater than a start time of the plurality of nodes and less than the end time of the plurality of nodes, and
   updating the rows of the plurality of nodes in the file system table according to the update request, wherein the start time of the plurality of nodes is set equal to the new snapshot timestamp.

18. The computer program product of claim 17, further including a second executable portion for using a snapshot identification (ID) for retrieving the snapshot timestamp for accessing the rows of the plurality of nodes under the snapshot.

19. The computer program product of claim 17, further including a second executable portion for, in conjunction using with the selective tuple versioning, performing one of:
   creating the plurality of nodes with at least a node identification (ID) and associated attributes, wherein the node identification and the associated attributes are included in the ows of the plurality of nodes in the file system table,
   adding a start time and an end time to a new one of a plurality of rows in the file system table, wherein the start time is set equal to the time when the new one of the plurality of rows was added to the file system table and the end time is set equal to infinity, and
   adding a new one of the plurality of rows to the snapshot table containing the snapshot ID and the snapshot time stamp upon creation of the snapshot.

20. The computer program product of claim 17, further including a second executable portion for relating the snapshot to the plurality of nodes having a start time that is less than the snapshot timestamp and an end time that is greater than the snapshot timestamp.

21. The computer program product of claim 17, further including a second executable portion for performing at least one of:
   adding at least one field to each of a plurality of rows in the file system table for indicating whether the plurality of nodes in the file system should be preserved,
   requesting to preserve the plurality of nodes by creating the snapshot,
   updating the file system during a lifetime of the snapshot, and
   removing a request to preserve the file system.

22. The computer program product of claim 17, further including a second executable portion for generating the snapshot timestamp at the time of creating the snapshot.

23. The computer program product of claim 19, further including a second executable portion for performing at least one of:
   deleting the snapshot and a snapshot identification (ID) upon receiving a request for the deleting, and
   deleting the plurality of nodes relating to the snapshot and the rows of the plurality of nodes in the file system table upon receiving a request for the deleting, wherein a query is performed for removing the plurality of nodes not associated with any other snapshots from the file system table.

24. The computer program product of claim 17, further including a second executable portion for, in conjunction with deleting the snapshot and the snapshot identification, performing at least one of:
   receiving a request for deleting the snapshot and the snapshot ID,
   retrieving from the snapshot table at least one of a preceding snapshot timestamp, a subsequent snapshot timestamp, and the snapshot timestamp, if a preceding snapshot to the snapshot that is to be deleted is not found in the snapshot table, setting the preceding snapshot timestamp to a value of zero, if a subsequent snapshot to the snapshot that is to be deleted is not found in the snapshot table, setting the subsequent snapshot timestamp to a value of infinity, and deleting the snapshot and the rows of the plurality of nodes in the file system table associated with the snapshot that are related to the plurality of nodes having a start time that is greater than the preceding snapshot timestamp and an end time that is less than the subsequent snapshot timestamp.

* * * * *